US00RE36155E

United States Patent [19]

Scallen

[11] E Patent Number: Re. 36,155

[45] Reissued Date of Patent: Mar. 23, 1999

[54] APPARATUS FOR CUTTING POTATOES AND ONIONS

[75] Inventor: David J. Scallen, Bentley, La.

[73] Assignee: The West Bend Company

[21] Appl. No.: 529,831

[22] Filed: Sep. 18, 1995

Related U.S. Patent Documents

Reissue of:

[64] Patent No.: 4,704,959
Issued: Nov. 10, 1987
Appl. No.: 821,049
Filed: Jan. 22, 1986

[51] Int. Cl.[6] ..... A47J 17/00

[52] U.S. Cl. ..... 99/538; 99/537; 99/584; 99/595

[58] Field of Search ..... 99/585, 595, 509, 99/537–543, 544, 545, 547, 548, 567, 584, 594–599, 636; 426/615, 637, 512, 518

[56] References Cited

U.S. PATENT DOCUMENTS

| | | |
|---|---|---|
| 100,280 | 3/1870 | Gerhard . |
| 509,564 | 11/1893 | Zehe . |
| 1,077,482 | 11/1913 | Lippincott . |
| 1,820,233 | 8/1931 | Leeds . |
| 1,900,491 | 3/1933 | Frank . |

(List continued on next page.)

FOREIGN PATENT DOCUMENTS

| | | |
|---|---|---|
| 575059 | 7/1924 | France . |
| 1025116 | 2/1958 | Germany . |
| 3046923 | 7/1982 | Germany . |
| 3708265 | 9/1988 | Germany . |
| Sho 50-108760 | 9/1975 | Japan . |
| Sho 52-48057 | 4/1977 | Japan . |
| Sho 57-11750 | 3/1982 | Japan . |
| Sho 58-31673 | 7/1983 | Japan . |
| Sho 61-22796 | 8/1986 | Japan . |

OTHER PUBLICATIONS

Norpro Apple–Mate 1 device. Photocopies showing a box panel and instruction are attached as Exhibit 5, undated.

NEMCO Spiral Fry device. A photograph showing the device is attached as Exibit 6, undated.

Progressive Spiral Potato Cutter Slicer Product. Photocopies showing the package and instruction sheet are attached as Exhibit 3, undated.

Kurly Ku Potato Cutter Assembly and Parts List. A photocopy showing the assembly and parts are attached as Exibit 4, undated.

(List continued on next page.)

*Primary Examiner*—Timothy F. Simone
*Attorney, Agent, or Firm*—Jansson, Shupe, Bridge & Munger, Ltd.

[57] ABSTRACT

An apparatus for cutting a potato into a helical shape, the apparatus having a hollow, generally cylindrical body, a cutting plate having a top side and a bottom side located in the body for cutting a potato into a helical shape when a potato is inserted into the body, forced against the cutting plate and rotated around the longitudinal axis of the body, the cutting plate having a plurality of vertical blades for cutting a potato extending perpendicularly upward from the cutting plate and a horizontal blade located above the cutting plate for cutting a potato, and a feeding apparatus for forcing a potato onto the cutting plate and for rotating the potato about the longitudinal axis of the cylindrical body to cut the potato into a helical shape, and an apparatus for cutting an onion into a helical shape, the apparatus having a hollow, generally cylindrical body, a cutting plate having a top side and a bottom side located in the body for cutting an onion into a helical shape when an onion is inserted into the body, forced against the cutting plate and rotated around the longitudinal axis of the body, the cutting plate having a horizontal blade located above the cutting plate for cutting an onion, and a feeding apparatus for forcing an onion onto the cutting plate and for rotating the onion about the longitudinal axis of the cylindrical body to cut the onion into a helical shape.

19 Claims, 3 Drawing Sheets

U.S. PATENT DOCUMENTS

| | | | |
|---|---|---|---|
| 2,022,151 | 11/1935 | Riddle | 146/177 |
| 2,156,645 | 5/1939 | Waller | 146/166 |
| 2,464,993 | 3/1949 | Ross | 146/164 |
| 2,489,581 | 11/1949 | Mason | 146/166 |
| 2,508,868 | 5/1950 | Ross | 146/164 |
| 2,715,927 | 8/1955 | Cupper et al. | 146/217 |
| 3,211,202 | 10/1965 | Mason | 99/592 |
| 3,452,794 | 7/1969 | Cooke et al. | 146/108 |
| 3,489,357 | 1/1970 | Takahashi | 241/95 |
| 3,522,460 | 8/1970 | Conney | 146/60 |
| 3,696,847 | 10/1972 | Erekson et al. | 146/42 |
| 3,874,259 | 4/1975 | Chambos et al. | 83/9 |
| 3,952,621 | 4/1976 | Chambos | 83/733 |
| 4,194,697 | 3/1980 | Lembeck | 241/92 |
| 4,198,887 | 4/1980 | Williams, Jr. | 83/356.3 |
| 4,311,283 | 1/1982 | Bounds | 241/95 |
| 4,348,950 | 9/1982 | Harris | 99/495 X |
| 4,363,266 | 12/1982 | Tichy et al. | 99/545 |
| 4,367,667 | 1/1983 | Shibata | 83/356.3 |
| 4,369,680 | 1/1983 | Williams | 83/13 |
| 4,387,111 | 6/1983 | Mullender | 99/538 X |
| 4,393,737 | 7/1983 | Shibata | 83/356.3 |
| 4,457,222 | 7/1984 | Finkel | 99/494 |
| 4,560,111 | 12/1985 | Cavalli | 241/92 |
| 4,581,990 | 4/1986 | Matsumoto | 99/538 |
| 4,619,192 | 10/1986 | Cycyk et al. | 99/538 |
| 4,628,808 | 12/1986 | Simon | 99/538 |
| 4,644,838 | 2/1987 | Samson et al. | 83/865 |
| 4,655,403 | 4/1987 | Sciortino | 241/92 |
| 4,669,191 | 6/1987 | Schramm | 30/358 |
| 4,738,195 | 4/1988 | Berube et al. | 99/591 |
| 4,765,234 | 8/1988 | Cailliot | 99/593 |
| 4,787,305 | 11/1988 | Akesson | 99/538 |
| 4,926,726 | 5/1990 | Julian | 83/165 |

OTHER PUBLICATIONS

"Home Salad" vegetable cutting device. The device appears to be identical to Japanese Utility Model No. Sho 57[1982]–11750 cited above. Exhibit 1 shows the device and packaging, undated.

"Saladacco" vegetable cutting device. The device appears to be identical to Japanese Utility Model No. Sho 52[1977]–48057 cited above. Exhibit 2 shows the device and packaging, undated.

APPARATUS FOR CUTTING POTATOES AND ONIONS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an apparatus for cutting potatoes. More particularly, the invention relates to a machine for cutting potatoes which are to be fried. Even more particularly, the present invention relates to an apparatus for cutting potatoes in a helical or spiral configuration, such potatoes being commonly referred to as curlicue potatoes. In another embodiment of the invention, onions may be sliced in a shape suitable for preparing fried onion rings.

2. Description of the Prior Art

Fried potatoes and onions are a popular food item in many countries including the United States. Fried potatoes are commonly referred to as french fried potatoes, the potatoes being cut into strips or other shapes and fried in grease or cooking oil.

Another popular shape for fried potatoes is that of a potato cut into the shape of a helix. Such potatoes are commonly referred to as curlicue potatoes. The potato is first cut into the shape of a helix and then is fried in grease or oil in the same manner as the common fried potatoes in the shape of a strip which are frequently referred to as french fries.

Various apparatuses are known in the art for cutting potatoes into a curlicue or helical shape prior to frying the potato. However, the devices of the prior art are generally complex and expensive, the price of such apparatuses being prohibitive for purchase by the ordinary consumer.

SUMMARY OF THE INVENTION

In accordance with the present invention there is provided an apparatus for cutting a potato into a helical shape, the apparatus having a hollow, generally cylindrical body, a cutting plate having a top side and a bottom side located in the body for cutting a potato into a helical shape when a potato is inserted into the body, forced against the cutting plate and rotated around the longitudinal axis of the body, the cutting plate having a plurality of vertical blades for cutting a potato extending perpendicularly upward from the cutting plate and a horizontal blade located above the cutting plate for cutting a potato, and a feeding apparatus for forcing a potato onto the cutting plate and for rotating the potato about the longitudinal axis of the cylindrical body to cut the potato into a helical shape.

In another embodiment of the present invention the vertical blades may be eliminated and the apparatus can be utilized to cut an onion into a spiral suitable for frying, such fried onions being commonly referred to as fried onion rings.

The apparatus of the invention is easy to construct and is therefore is low in cost. The apparatus of the invention is simple to operate and requires very little effort on the part of the user. Furthermore, the apparatus of the present invention is safe to operate and protects the hands of the user from being cut while preparing potatoes or onions for frying. The apparatus may be easily cleaned and is small in size for easy storage. Furthermore, the apparatus is lightweight and can be easily moved about by the user.

DESCRIPTION OF THE PREFERRED EMBODIMENTS

Figure 1:
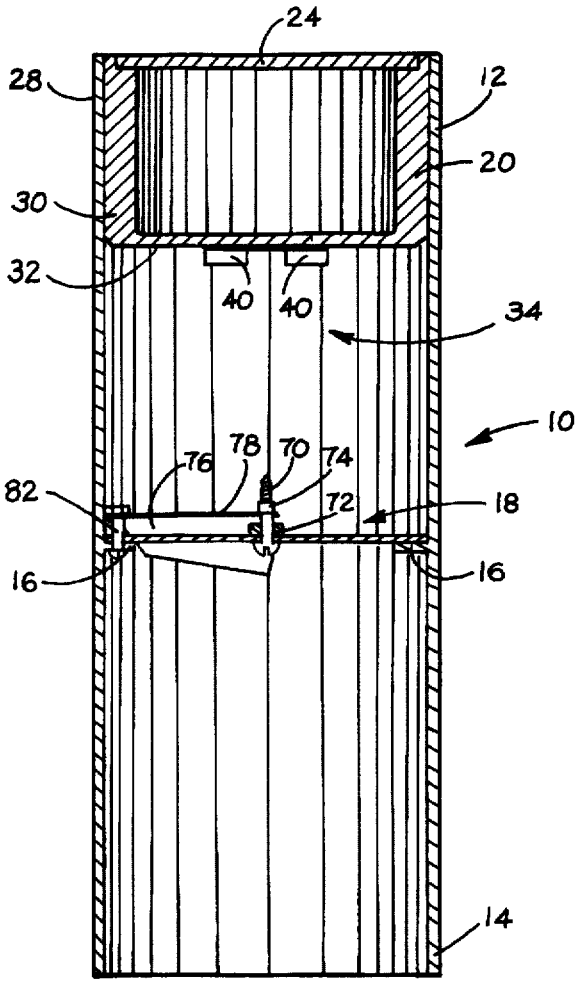
FIG. 1 is a cross-sectional, elevational view of the apparatus of the present invention.
Figure 15:
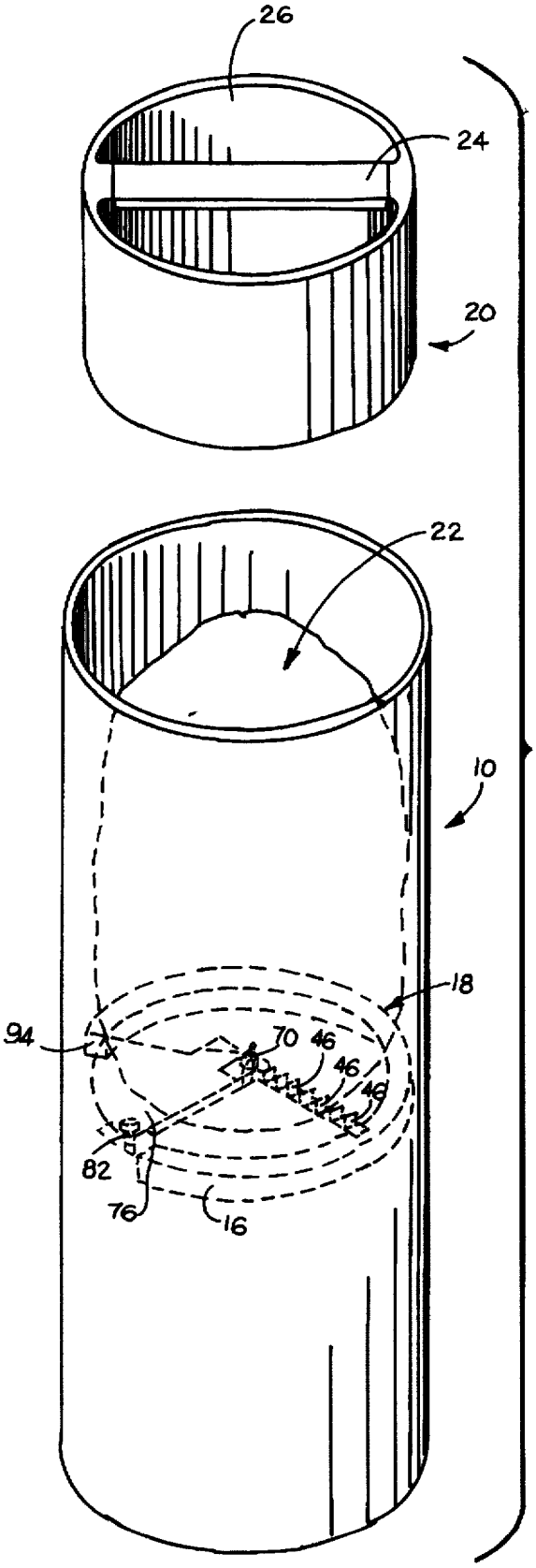
FIG. 15 is a perspective view of the potato cutting apparatus of the invention.

Referring now to the drawings, in FIGS. 1 and 15 the apparatus of the invention can be seen to include a generally cylindrical body generally indicated by the numeral 10. The cylindrical body is open at its top end 12 and bottom end 14, and is hollow inside.

Located approximately mid way between top end 12 and bottom end 14 of body 10 is a lip 16 which extends around the inside of body 10. Lip 16 provides support for the cutting plate assembly generally indicated by the numeral 18 shown in FIGS. 1, 2 and 15.

A feeder apparatus generally indicated by the numeral 20 is slidably received inside of body 10. Feeder 20 is utilized to contact a potato such as that generally indicated by numeral 22 in FIG. 15 and for forcing and rotating the potato against cutting blade 18 to cut the potato into the desired shape. The feeder is cylindrical in shape and is sized to be slidably received in body 10, be easily rotated in body 10 and moved upwardly and downwardly along the longitudinal axis of the body 10. Preferably feeder 20 has a bar 24 which can be grasped by the hand of the user to force the feeder upwardly and downwardly and also to rotate the feeder relative to body 10. In order to construct the feeder 20 as inexpensively as possible, the interior 26 of the feeder is preferably hollow. Bar 24 is located at the top end 28 of feeder 20, and at the bottom end 30 of feeder 20 is located a cover plate 32. Cover plate 32 can be integrally molded with feeder 20 if desired.

Figure 4:
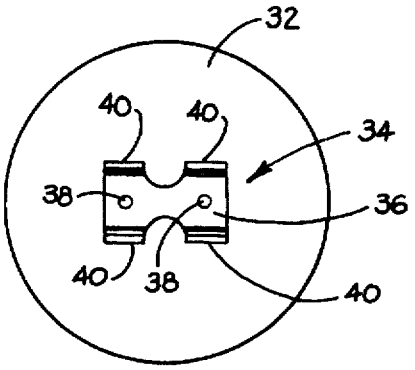
FIG. 4 is a top view of the potato feeder of the invention.

Attached to the bottom of cover plate 32 is twisting member 34 which is rigidly connected to bottom plate 32 and is utilized to contact and twist a potato such as 22 or any other vegetable which is desired to be cut by the apparatus of the invention. Twisting member 34, as can be seen in FIGS. 1 and 4, includes a flat plate 36 rigidly connected to bottom plate 32 by rivets or screws 38 having a plurality of protuberances 40 extending perpendicularly downwardly therefrom. Protuberances 40 may be integrally molded with twisting member 34 and may be of any desired number to efficiently contact and turn potato 22 or any other desired vegetable such as an onion. Twisting member 34 may assume other configurations as desired so long as the twisting member permits the potato to be turned when feeder 20 is rotated and forced downwardly.

Figure 2:
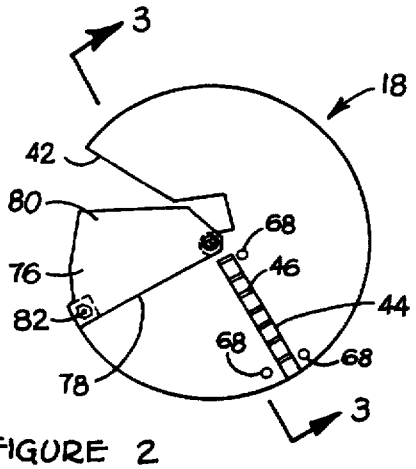
FIG. 2 is a top plan view of the cutting plate of the potato cutting apparatus of the invention.
Figure 3:
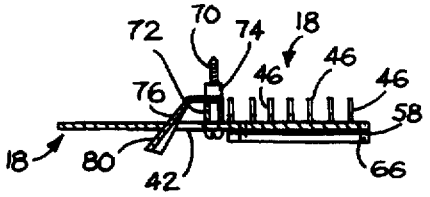
FIG. 3 is a sectional view taken along lines 3—3 of FIG. 2.

The cutting plate generally indicated by the numeral 18 can be seen in FIG. 2 lo be generally circular in shape. Cutting plate 18 has a first opening 42 through which potatoes and onions may fall after being cut. Plate 18 has a second opening 44 therein through which are received vertical cutting blades 46. Vertical cutting blades are perpendicular to the surface of cutting plate 18 as can be seen in FIG. 3.

Figure 5:
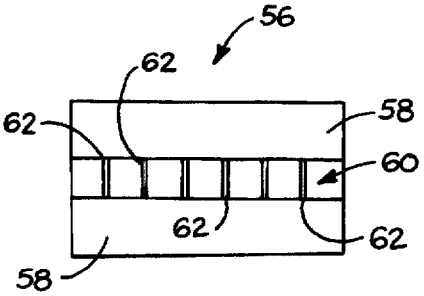
FIG. 5 is a top plan view of the blade receiving plate of the invention.
Figure 7:
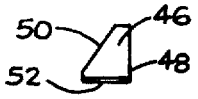
FIG. 7 is a side elevational view of a first embodiment of the vertical cutting blades of the invention.
Figure 8:
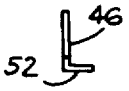
FIG. 8 is a front elevational view of the vertical cutting blade in FIG. 7.
Figure 6:
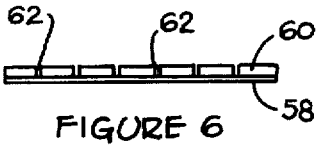
FIG. 6 is a side of the plate shown in FIG. 5.

Cutting blades 46 are shown in FIG. 7 and FIG. 8. Cutting blade 46 preferably have a sharpened cutting edge 48 and a sloping trailing edge 50. Vertical cutting blades 46 have a lip 52 connected perpendicular thereto. Cutting blades 46 are inserted into a blade receiving plate generally indicated by the numeral 56 shown in FIGS. 5 and 6.

Blade receiving plate 56 has two flat cars 58 lying in the same plane and has a raised portion 60 having a series of parallel slots 62 therein for receipt of blades 46. The raised portion 60 contacts lip 52 when blades 46 are inserted therein.

Figure 13:
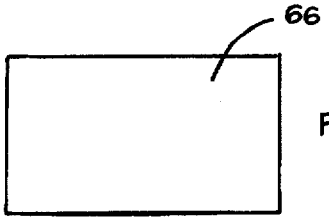
FIG. 13 is a plan view of the cover plate of the present invention.
Figure 14:
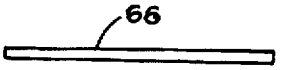
FIG. 14 is a side view of FIG. 13.

To hold blades 46 in place, preferably a back tip plate 64 is fitted underneath lip 52 of blades 46 after blades 46 are inserted into blade receiving plate 56. Back up plate 64 is sized to fit inside of raised portion 60 and is held in place by cover plate 66 shown in FIG. 13 and in FIG. 14. Cover plate 66 and blade receiving plate 56 are attached to the bottom of cutting plate 18 as shown in FIG. 3 and 2 by rivets or screws 68 or by any other conventional fastening means such as gluing, welding, molding or the like.

Located in the center of cutting plate 18 is guide screw 70 which has threads thereon which can be seen in FIG. 3. Guide screw 70 is threaded into bushing 72 shown in FIGS. 1 and 3 and into bushing 74.

Located between bushing 72 and 74 is horizontal blade 76. Horizontal blade 76 has a cutting edge 78 and a downwardly sloping trailing edge 80. Trailing edge 80 directs potatoes downwardly which have been cut by horizontal blade 76 and vertical blades 46 through opening 42. Fastener 82 secures the outer edge of horizontal cutting blade 76. Fastener 82 may be a screw bolt or any other suitable conventional fastening means.

Figure 9:
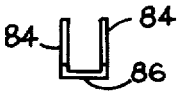
FIG. 9 is a second embodiment of the cutting blade of the present invention shown in a front elevational view.
Figure 10:
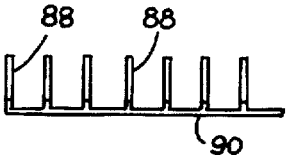
FIG. 10 is a third embodiment of the cutting blades of the present invention shown in a front elevational view.
Figure 11:
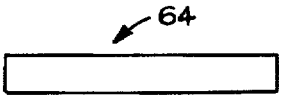
FIG. 11 is a plan view of a back up plate of the present invention.
Figure 12:
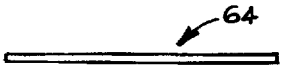
FIG. 12 is a side view of the back up plate shown in FIG. 11.

In FIGS. 9 and 10 are shown additional embodiments of vertical cutting blades. In FIG. 9, two vertical cutting blades 84 are connected by lip 86, thus pairs of the vertical cutting blades can be joined and inserted into slot 62. In FIG. 10 is shown a plurality of cutting blades 88 mounted on a bar 90. Thus in the embodiment shown in FIG. 10 all of the desired vertical blades may be joined on one common bar and inserted into slots 62 of blade receiving plate 56.

Figure 16:
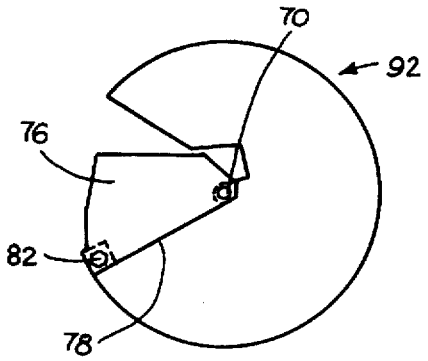
FIG. 16 is a top plan view of another embodiment the cutting plate of the invention utilized for preparing sliced onions.

In another embodiment of the apparatus of the present invention, cutting plate 18 is replaced with the cutting plate generally indicated by the numeral 92 in FIG. 16. Cutting plate 92 is identical to cutting plate 18 with the exception that there is no vertical blade assembly and no hole 44 for receipt of the vertical blade assembly, thus the only cutting blade would be cutting blade 76 and the apparatus could be used for cutting an onion into spiral slices which could be utilized in the preparation of fried onions commonly called onion rings. Horizontal blade 76 would have a cutting edge 78 and cutting plate 92 would include guide screw 70.

Lip 16 should not extend completely around the interior body 20. As shown in FIG. 15 an opening 94 should be provided *in* lip 16 so that fastener 82 can contact the edge of the lip in prevent cutting plate 18 from turning.

To operate the apparatus of the present invention a potato is inserted into body 10 as shown in FIG. 15. The potato is inserted lengthwise preferably so that the potato contacts guide screw 70 at its end. Feeder 20 is then inserted into the top of body 10 and forced downwardly. Feeder 20 is then rotated clockwise, viewing feeder 20 from the top, to cause potato 22 to be cut by vertical blades 46 and horizontal blade 76 into a series of long, spiral, continuous pieces of potatoes having a generally rectangular cross section and being particularly suitable for frying to make curlicue potatoes.

If the cutting plate 92 of FIG. 16 is utilized, most preferably an onion is the vegetable being sliced. The onion is inserted into the top of body 10 and feeder 20 is forced downwardly thereon forcing the onion into contact with horizontal blade 46 and guide screw 70. Feeder 20 is rotated while applying downward [forced] *force* on the onion. The onion is sliced by horizontal blades 76 alone to provide an onion sliced into a continuous spiral which may then be fried to form fried onion rings.

Although the preferred embodiments of the present invention have been disclosed and described in detail above, it should be understood that the invention is in no sense limited thereby, and its scope is to be determined by that of the following claims.

What is claimed is:

1. An apparatus for cutting a potato into a helical strip having a rectangular cross-section comprising:

a. a hollow, generally cylindrical body [means] *member* having a top end and a bottom end;

b. a *stationary* cutting plate [means] *member secured across the hollow, cylindrical body member and* having a top side facing toward said top and a bottom side facing toward said bottom end, said cutting plate [means] *member* being located in said body [means] *member* for cutting a potato into a helical strip having a rectangular cross-section when a potato is inserted in said top end of said body [means] *member*, forced against said top side of said cutting plate [means] *member* and rotated around the longitudinal axis of said body [means] *member*, said cutting plate [means] *member* having a plurality of vertical blades on said top side for making vertical cuts in said potato as the potato is rotated, said vertical blades extending perpendicularly upward from the top side of said cutting plate [means] *member*, and a horizontal blade spaced upwardly from said top side of said cutting [plate means] *blade* for cutting said potato horizontally as said potato is rotated, said cutting plate [means] *member* having *a* first opening [means] therein through which a portion of a potato may travel from said top side of said cutting plate [means] *member* to said bottom side of said cutting plate [means] *member* into said bottom end of said body [means] *member* after being cut by said horizontal and vertical [blade means] *blades*, [and]

c. *a* feeder [means] *member, which has a generally cylindrical portion and a generally circular portion*

*axially fixed with respect thereto in telescoping cooperation with the body member to provide radial constraint therebetween,* for forcing a potato into the top end of said body [means] *member* and onto said top side of said cutting plate [means] *member* and for rotating a potato about the longitudinal axis of said cylindrical body [means] *member* to cut said potato into a helical strip and to force said helical strip through said first opening [means] in said cutting plate [means] *member* into the bottom end of said body [means] *member;*

*d. the circular portion, cutting plate member and one of the telescoping members forming a confined action space of manually-varied axial length in which an uncut potato is rotated while it is forced against the cutting plate member by relative axial movement of the cutting plate member and feeder member; and*

*e. a manual gripping handle integral with one of the telescoping members;*

*whereby a user can readily move the telescoping members axially together in radially-constrained fashion.*

2. The apparatus of claim 1 wherein said body [means] *member* has holding means therein for holding said cutting plate [means] *member* therein.

3. The apparatus of claim 2 wherein said holding means prevents said cutting plate [means] *member* from rotating when a potato is forced onto the top of said cutting plate [means] *member* and rotated about the longitudinal axis of said body [means] *member.*

4. The apparatus of claim 1 wherein said cutting plate [means] *member* has guide post [means] extending upwardly from said cutting plate [means] *member* for insertion in a potato.

5. The apparatus of claim 4 wherein said *at least one* guide post [means] has threads thereon and is located at the center of said cutting plate [means] *member.*

6. The apparatus of claim 5 wherein said cutting plate [means] *member* is circular in shape.

7. The apparatus of claim 1 wherein said vertical blades extend upwardly through *a* second opening [means] in said cutting plate [means] *member.*

8. The apparatus of claim 7 wherein said vertical blades are held in *a* rack [means] connected to said cutting plate [means] *member.*

9. The apparatus of claim 8 wherein said rack [means] comprises a blade receiving plate having a plurality of parallel slots therein for receipt of said vertical blades and a cover plate connected to said blade receiving plate for holding said vertical blades in said parallel slots.

10. The apparatus of claim 8 wherein said vertical blades have a lip [means] *member* connected thereto [which are] located and held between said blade receiving plate and said cover plate.

11. The apparatus of claim 8 wherein said rack [means] is connected to said bottom side of said cover plate [means] *member.*

[12. The apparatus of claim 8 wherein at least two of said plurality of vertical blades means are connected by lip means.]

[13. The apparatus of claim 10 wherein said lip means is perpendicular to said blade means.]

14. The apparatus of claim 1 wherein said horizontal blade [means] has a cutting edge and a downwardly sloping surface extending away from the cutting edge to direct the cut portion of a potato through the first opening [means] in said cutting plate [means] *member.*

[15. The apparatus of claim 1 said feeder means comprises a generally hollow cylindrical having a bottom end and a top end, said bottom end having a flat circular plate therein for contacting and rotating a potato, said top end having grasping means therein for grasping by the hand of the operator to rotate said feeder means and force said feeder means toward said cutting plate means.]

16. The apparatus of claim 15 wherein said feeder means has twisting means connected thereto to contact a potato and rotate the potato as said feeder means is rotated.

17. The apparatus of claim 16 wherein said twisting means is attached to said flat circular plate.

18. The apparatus of claim 1 wherein said vertical blades extend above said cutting plate [means] *member* a distance equal to or greater than the distance said horizontal blade is spaced upwardly from said cutting plate [means] *member.*

[19. An apparatus for cutting an onion into a helical strip having a rectangular cross-section comprising:

a. a hollow, generally cylindrical body means having a top end and bottom end, b. a cutting plate means having a top side facing toward said top end and a bottom side facing toward said bottom end, said cutting plate means being located in said body means for cutting an onion into a helical strip having a rectangular cross-section when a potato is inserted in said top end of said body means, forced against said top side of said cutting plate means rotated around the longitudinal axis of said body means, a horizontal blade spaced upwardly from said top side of said cutting plate means for cutting said onion horizontally as said onion is rotated, said cutting plate means having first opening means therein through which a portion of an onion may travel from said top side of said cutting plate means to said bottom side of said cutting plate means into said bottom end of said cutting means after being cut by said horizontal blade means, and c. feeder means for forcing an onion into the top end of said body means and onto said top side of said cutting plate means and for rotating an onion about the longitudinal axis of said cylindrical body means to cut said onion into a helical strip and to force said helical strip through said first opening means in said cutting plate means into the bottom end of said body means.]

*20. The apparatus of claim 8 wherein at least two of said plurality of vertical blades are connected by the lip member.*

*21. The apparatus of claim 10 wherein said lip is perpendicular to said blade.*

*22. An apparatus for cutting a potato into a helical strip having a rectangular cross-section comprising:*

*a. a hollow, generally cylindrical body means having a top end and a bottom end,*

*b. a cutting plate means having g top side facing toward said top end and a bottom side facing toward said bottom and, said cutting plate means being located in said body means for cutting a potato into a helical strip having a rectangular cross-section when a potato is inserted in said top end of said body means, forced against said top side of said cutting plate means and rotated around the longitudinal axis of said body means, said cutting plate means having a plurality of vertical blades on said top side for making vertical cuts in said potato as the potato is rotated, said vertical blades extending perpendicularly upward from the top side of said cutting plate means, and a horizontal blade spaced upwardly from said top side of said cutting plate means for cutting said potato horizontally as said potato is rotated, said cutting plate means having first*

*opening means therein through which a portion of a potato may travel from said top side of said cutting plate means to said bottom side of said cutting plate means into said bottom end of said body means after being cut by said horizontal and vertical blades, and*

*c. feeder means for forcing a potato into top end of said body means and onto said top side of said cutting plate means and for rotating a potato about the longitudinal axis of said cylindrical body means to cut said potato into a helical strip and to force said helical strip through said first opening means in said cutting plate means into the bottom end of said body means, said feeder means comprising a generally hollow cylinder having a bottom end and a top end, said bottom end having a flat circular plate therein for contacting and rotating a potato, said top end having grasping means therein for grasping by the hand of the operator to rotate said feeder means and force said feeder means toward said cutting plate means.*

*23. An apparatus for cutting an onion into a helical strip having a rectangular cross-section comprising:*

*a. a hollow, generally cylindrical body member having a top end and a bottom end;*

*b. a stationary cutting Plate member secured across the hollow, cylindrical body member and having a top side facing toward said top end and a bottom side facing toward said bottom end, said cutting plate member being located in said body member for cutting an onion into a helical strip having a rectangular cross-section when an onion is inserted in said top end of said body member, forced against said top side of said cutting plate member and rotated around the longitudinal axis of said body member, a horizontal blade spaced upwardly from said top side of said cutting plate member for cutting said onion horizontally as said onion is rotated, said cutting plate member having a first opening therein through which a portion of an onion may travel from said top side of said cutting plate member to said bottom side of said cutting plate member into said bottom end of said body member after being cut by said horizontal blade;*

*c. a feeder member which has a generally cylindrical portion and a generally circular portion axially fixed with respect thereto in telescoping cooperation with the body member to provide radial constraint therebetween, for forcing an onion into the top end of said body member and onto said top side of said cutting plate member and for rotating an onion about the longitudinal axis of said cylindrical body member to cut said onion into a helical strip and to force said helical strip through said first opening in said cutting plate member into the bottom end of said body member;*

*d. the circular portion, cutting plate member and one of the telescoping members forming a confined action space of manually-varied axial length in which an uncut onion is rotated while it is forced against the cutting plate member by relative axial movement of the cutting plate member and feeder member; and*

*e. a manual gripping handle integral with one of the telescoping member;*

*whereby a user can readily move the telescoping members axially together in radially-constrained fashion.*

* * * * *